3,225,073
SULFURIC ACID SEMI-ESTER QUATERNARY AMMONIUM COMPOUNDS
Dietrich Glabisch, Leverkusen, Martin Wandel, Dormagen, and Josef Witte, Cologne-Stammheim, Germany, assignors to Farbenfabriken Bayer Aktiengesellschaft, Leverkusen, Germany, a corporation of Germany
No Drawing. Filed Oct. 10, 1961, Ser. No. 144,037
Claims priority, application Germany, Nov. 8, 1960,
F 32,495
3 Claims. (Cl. 260—401)

The present invention relates to new quaternary ammonium compounds and a process for producing the same.

The quaternary ammonium compounds of the invention correspond to the general formula

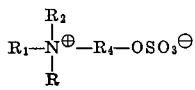

wherein $R_1$, $R_2$ and $R_3$ stand independently from each other for aliphatic, alicyclic and/or aromatic hydrocarbon, $R_1$ and $R_2$ including alkyl containing 1–4 carbon atoms, $R_3$ including alkyl having up to 18 carbon atoms and $R_4$ stands for an alkylene radical which may be substituted by alkyl or aryl radicals.

The process for producing the quaternary compounds consists in reacting tertiary amines with alkylene oxides and sulfur trioxide.

As amines there may chiefly be considered triethylamine, tripropylamine, tributylamine, methyl-diethylamine, hexyl-dimethylamine, cyclohexyl-dimethylamine, dodecyl-dimethylamine, hexadecyl-dimethylamine and octadecyl-dimethylamine, furthermore those tertiary amines in which preferably one of the three hydrocarbon radicals is ester-like or amide-like linked with a fatty acid of 2–18 carbon atoms such as, for example, dimethylamino ethanol esterified with acetic acid, propionic acid or stearic acid, or acetic acid, butyric or stearic acid amidated with 3-dimethyl-aminopropylamine.

Suitable alkylene oxides include lower akylene oxides of 2–3 carbon atoms, for example, ethylene oxide, propylene oxide and styrene oxide.

The reaction is advantageously carried out in such a manner that the sulfur trioxide is first introduced into a suitable inert adsorbent, such as pyridine and/or dioxan, at temperatures between 0 to 25° C. with the exclusion of moisture, the alkylene oxide is subsequently added at temperatures between —10 and 0° C., and the reaction mixture is then treated with the amine at temperatures between 0 to +10° C. The use of an adsorbent becomes unnecessary if the reaction is carried out at about —40° C. in an inert solvent such as carbon tetrachloride. The components sulfur trioxide and alkylene oxide which are to be employed in a molecular ratio of 1:1, are used in relation to the amine advantageously in an excess of 5–10 percent by weight.

The quaternary ammonium compounds produced according to the invention possess a number of useful properties; they may, for example, be used as emulsifiers, dispersing agents for fillers, disinfectants and antistatic agents. On account of their sulfuric acid semi-ester structure they can also be applied as alkylating agents.

The following examples serve to illustrate the invention without, however, limiting the scope thereof; the parts indicated are parts by weight.

*Example 1*

73 parts of sulfur trioxide are introduced at 0–10° C. with good stirring into 216 parts of dry pyridine. A white, fine-grain addition product, $C_5H_5N:SO_3$, precipitates. The resulting reaction mixture is stirred at 20° C. for a further 30 minutes, then cooled to —10° C. and treated within 10 minutes with 40.2 parts of liquified ethylene oxide. The mixture is kept at 0° C. for 1 hour and then treated with 195 parts of dodecyl-dimethylamine, the temperature being slowly raised to 20° C. The resultant thickly liquid solution is freed of pyridine by vacuum distillation, and the residue is subsequently allowed to stand over concentrated sulfuric acid for about 24 hours to remove residual pyridine. The reaction product to which is ascribed the empirical formula $C_{16}H_{35}O_4NS$, shows the following analysis values:

Calculated: C, 57.0; H, 10.4; S, 9.5. Found: C, 57.22; H, 10.63; S, 9.9.

The product represents a solid, nearly white, soap-like mass; it forms with water clear solutions which are capable of strongly foaming.

*Example 2*

A solution of 22 parts of ethylene oxide in 300 parts of carbon tetrachloride is cooled to —40° C. and 40 parts of sulfur trioxide are then introduced with stirring. 106 parts of dodecyl-dimethylamine are subsequently added dropwise at —30° C. with stirring to the white paste formed, and the mixture is stirred at 0° C. for a further hour. After distilling off the solvent, 105 parts of a soap-like paste are obtained which exhibits the same properties as the product prepared according to Example 1.

*Example 3*

As described in Example 1, a mixture is prepared of 216 parts of dry pyridine, 78 parts of sulphur trioxide and 44 parts of ethylene oxide, and this mixture is then treated with a mixture of 100 parts of pyridine and 320 parts of dimethylaminoethanol esterified with steric acid, the temperature being slowly raised from 0 to 20° C. After working up as described in Example 1, 420 parts of a soap-like, solid reaction product are obtained which readily dissolves in water and has a strong foaming capacity.

We claim:

1. A quaternary ammonium compound of the formula

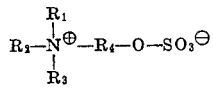

wherein $R_1$ and $R_2$ are defined as alkyl containing 1–4 carbon atoms, $R_3$ is a member selected from the group consisting of hydroxy alkyl having up to 2 carbon atoms esterified with a fatty acid of 2–18 carbon atoms and cyclohexyl; and $R_4$ is a member selected from the group consisting of ethylene and propylene.

2. A process for producing a quaternary ammonium compound of the formula

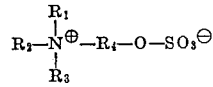

wherein $R_1$ and $R_2$ are independently defined as alkyl containing 1–4 carbon atoms; $R_3$ is a member selected from the group consisting of alkyl having up to 18 carbon atoms, hydroxy alkyl containing up to 2 carbon atoms esterified by a fatty acid of 2–18 carbon atoms, and cyclohexyl; and $R_4$ is a member selected from the group consisting of ethylene and propylene; the improvement consisting in introducing sulfur trioxide into a suitable inert absorbent at a temperature of about 0–25° C. with the exclusion of moisture, adding alkylene oxide in about an equal molecular ratio at a temperature of about $-10°$ C.$-0°$ C., and thereafter contacting with a reactive amount of a tertiary amine of the formula

wherein $R_1$, $R_2$ and $R_3$ have the above meaning, and recovering the resulting product.

3. The compound of the formula

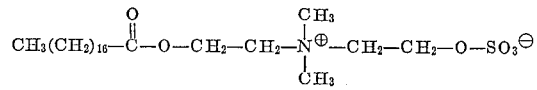

References Cited by the Examiner

UNITED STATES PATENTS 2,129,264  9/1938  Downing et al. _____ 260—501

FOREIGN PATENTS 1,018,421  10/1957  Germany.

OTHER REFERENCES

Kuhn et al., Ber. Deut. Chem., volume 70 pages 1333–1341 (1937).

CHARLES B. PARKER, *Primary Examiner.*

LEON ZITVER, JOSEPH P. BRUST, *Examiners.*